(12) United States Patent
Messerlie et al.

(10) Patent No.: US 7,827,785 B2
(45) Date of Patent: Nov. 9, 2010

(54) HYDRAULIC SYSTEM WITH WARM UP CIRCUIT

(75) Inventors: Edward C. Messerlie, Platteville, WI (US); Neil V. Harber, Holy Cross, IA (US); Joshua D. Graeve, Peosta, IA (US)

(73) Assignee: Deere & Company, Moline, IL (US)

( * ) Notice: Subject to any disclaimer, the term of this patent is extended or adjusted under 35 U.S.C. 154(b) by 400 days.

(21) Appl. No.: 11/949,244

(22) Filed: Dec. 3, 2007

(65) Prior Publication Data

US 2009/0139395 A1   Jun. 4, 2009

(51) Int. Cl.
*F15B 11/06* (2006.01)
*F16D 39/00* (2006.01)
(52) U.S. Cl. .......................................... 60/329; 91/431
(58) Field of Classification Search ................... 60/329; 91/304, 419, 431; 137/625.6
See application file for complete search history.

(56) References Cited

U.S. PATENT DOCUMENTS 4,972,762 A   11/1990   Kubik .................... 91/461
5,251,440 A   10/1993   Bong-Dong et al.
6,397,590 B1   6/2002   Hart ............................ 60/329

FOREIGN PATENT DOCUMENTS

JP           59054805           3/1984
JP           2001182705 A   *   7/2001

* cited by examiner

*Primary Examiner*—Thomas E Lazo
(74) *Attorney, Agent, or Firm*—Taylor IP, P.C.

(57) ABSTRACT

A hydraulic control system in which a pump for pressurized hydraulic fluid connects with a valve assembly having a valve element displaceable in a chamber to selectively direct fluid to a load driven by the hydraulic system. Surfaces on the end faces of the valve element are exposed to hydraulic pressure from a controller via electro-hydraulic solenoid valves. The surfaces of the valve element adjacent the end faces are undercut to establish a leakage flow path and the solenoid valves are selectively actuated to pressurize the end faces to a level below normal actuation of the valve element but high enough to cause fluid to return to a drain and thus increase the temperature of the hydraulic fluid in the system.

21 Claims, 1 Drawing Sheet

HYDRAULIC SYSTEM WITH WARM UP CIRCUIT

FIELD OF THE INVENTION

The present invention relates to a hydraulic system, and more specifically to electro-hydraulic control systems.

BACKGROUND OF THE INVENTION

The hydraulic control system has been used for many years in the agricultural and industrial field to actuate various components in vehicles used for these purposes. These components, generally referred to as loads, may be a plows, discs, backhoes, augers and many other types of devices. The hydraulic systems generally comprise a pump (usually driven by the prime mover for the vehicle) that pressurizes hydraulic fluid for selective delivery to actuators to manipulate a load. The typical actuator has a piston within a chamber attached to an output shaft. Hydraulic fluid is selectively directed to either face of the piston in order to displace the actuating rod. This enables a force to be applied to the load that is far greater than any operator could do through mechanical linkages.

Early systems of this type used a manual actuation of the valve controlling hydraulic fluid to either side of the actuator piston. As implements and equipment have become more complex and complicated the manual actuation of the valve has been replaced by electro-hydraulic systems.

Many electro-hydraulic systems supply pressurized fluid to at least one, and preferably two faces of a control valve that directs pressurized fluid to the actuator. Solenoid operated valves direct control fluid from an appropriate source, which in a typical case is the same as the actuating fluid. The solenoid valves are controlled from an appropriate controller so that the valve elements may be dispersed throughout the vehicle and do not have to be adjacent the operator for manual actuation. The use of electrical signals to control this function also enables additional control functions and sophistication in terms of safety overrides and other advanced system requirements.

One of the problems, however, with electro-hydraulic valves is that with agricultural and industrial equipment the vehicle frequently is stored outside and is exposed to whatever ambient temperature is adjacent the vehicle. The hydraulic fluid is a viscosity dependent liquid that has a significant increase in viscosity for low ambient temperatures. As such, initial startup of systems of this type experience sluggish response to control inputs owing to the fact that the passages for the control of the main valve are relatively small, thus causing a delay in delivery of fluid to the end of the valve element. There have been a number of proposals that establish secondary and discrete circuits to achieve warm-up of the system by pressurizing and throttling the pressurized fluid to a drain. However, these add unnecessary expense and complication to the system.

Accordingly, what is needed in the art is a simplified system for increasing the temperature of hydraulic fluid for systems of this type.

SUMMARY OF THE INVENTION

The invention, in one form, includes a hydraulic control valve with a housing having an inlet for pressurized fluid, a chamber connected to the inlet and a pair of outlets directing fluid to a load. A valve element is displaceable in the chamber to selectively direct fluid to the outlets, the valve element having at least one surface responsive to fluid pressure to displace the valve for selectively directing pressurized fluid to the outlet. A device establishes a selective leakage flow path adjacent the valve element surface so as to increase the temperature of the hydraulic fluid for the valve.

In another form, the invention includes a hydraulic system having a pump for producing pressurized fluid. A load is connected to the pump through a hydraulic control valve and is controlled through a controller to selectively direct pressurized fluid to the load for actuation. A hydraulic control valve has a housing with an inlet connected to the pressurized fluid from the pump and a pair of outlets for selectively directing hydraulic fluid to the load. A chamber, connected to the inlet and outlets, has a valve element displaceable to selectively direct fluid to the outlets. The valve element has at least one surface responsive to fluid pressure to displace the valve for selectively directing fluid to the load as commanded by the controller. A device is included to establish a selective leakage path from adjacent the surface on said valve element to increase the temperature of the hydraulic fluid.

DETAILED DESCRIPTION OF THE INVENTION

Figure 1:
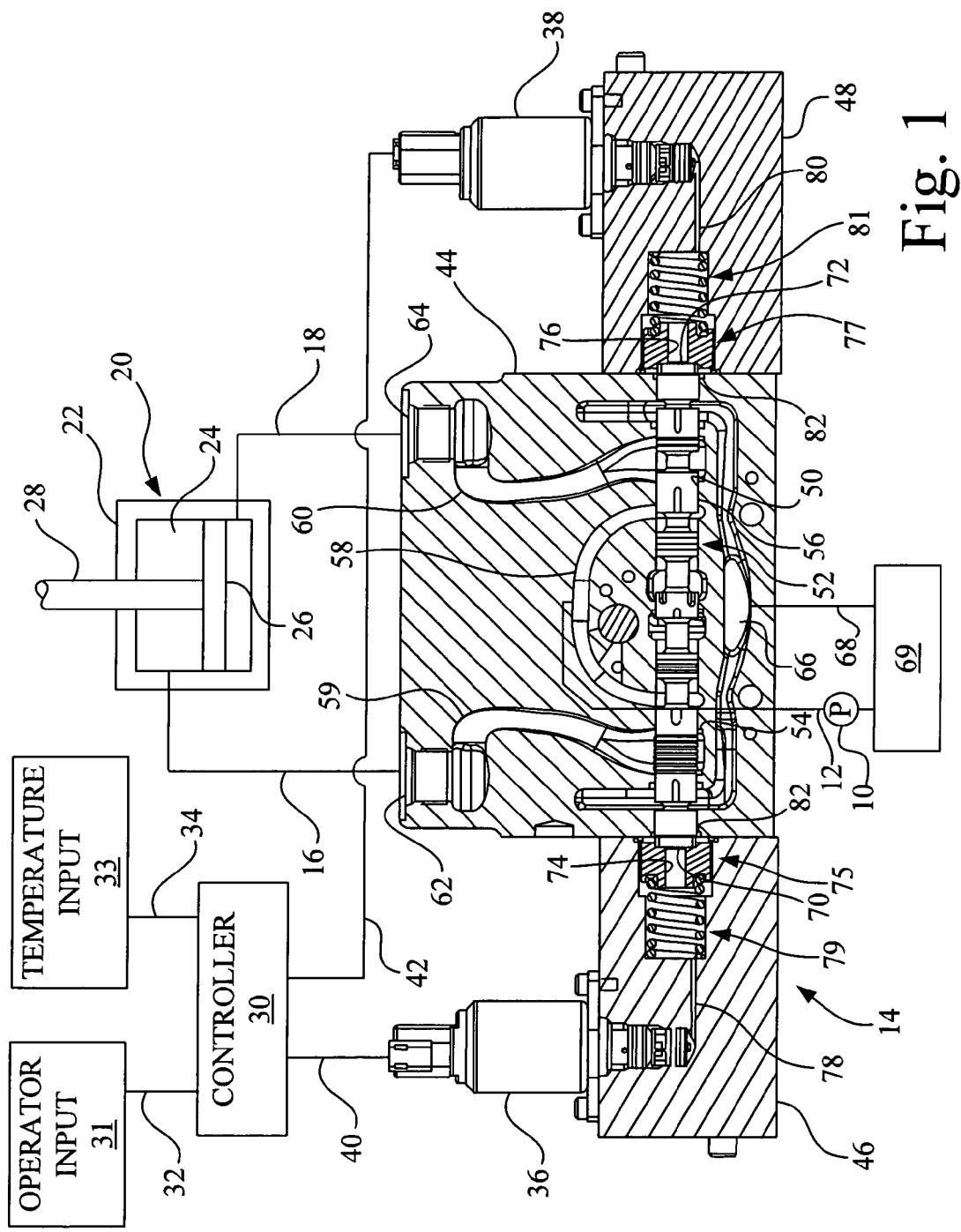
FIG. 1 shows a longitudinal cross-section of a valve according to the present invention, along with schematic elements of a hydraulic system with which the valve element is used.

Referring to FIG. 1, there is shown a hydraulic system comprising a pump 10 for hydraulic fluid having a high pressure feed line 12 extending to a control valve generally indicated by reference character 14. Control valve 14 selectively directs pressurized fluid through outlet conduits 16 and 18 to an actuator 20. Actuator 20 comprises a housing 22 forming a chamber 24 in which a piston 26 reciprocates. Piston 26 is connected to an output shaft 28 so that displacement of piston 26 within chamber 24 causes the output shaft 28 to linearly displace. Pressurized hydraulic fluid in the conduits 16 and 18 act on opposite sides of piston 26 to control the displacement of the output shaft 28. Although a linearly displaceable actuator 20 is illustrated, it should be apparent to those skilled in the art that many different forms of hydraulically actuated devices may be employed with the present invention.

The control of valve 14 is provided by controller 30 that receives operator input 31 from line 32 and optionally a temperature input 33 from line 34. It is also possible to provide other control inputs, e.g. engine load as will be apparent to those skilled in the art. Controller 30, as illustrated, generates electrical outputs to be fed to linear electrical solenoids 36 and 38 through lines 40 and 42, respectively. The solenoid valves 36 and 38 function to control direction of fluid through conduits 16 and 18 as will be described below.

Valve assembly 14 comprises a central housing 44 to which solenoid valve housings 46 and 48 are secured by appropriate fasteners. Central housing 44 has a longitudinal bore 50 in which a spool valve 52 is positioned for displacement in an axial direction. Spool valve 52 has a series of lands that enable particular functions of the spool valve 52 to be achieved. For purposes of the present discussion, only those lands essential to the operation of the present invention will be discussed. A pair of lands 54 and 56 cooperates with high pressure passage 58 to selectively direct pressurized fluid from line 12 past the lands 54 and 56 to passages 59 and 60. Passages 58 and 60 connect to outlets 62 and 64 which in turn connect to conduits 16 and 18. The spool valve 52 has a sump chamber 66 connected to a return line 68 leading to pump 10 through reservoir 69. It should be apparent to those skilled in the art that typically the pump would include a reservoir and tank 69 to supply hydraulic fluid to pump 10.

The spool valve element 52 has end faces 70 and 72 which are acted on by pressure in bores 74 and 76 to apply pressurized fluid to the end faces 70 and 72 thus displacing the spool valve element 52 longitudinally and directing fluid to conduits 16 or 18. The bores 74 and 76 are supplied with control fluid through passages 78 and 80 in housings 46, 48 leading from solenoid valves 36 and 38, respectively. Bores 74 and 76 are formed in valve seats 75 and 77 that abut the end faces 70 and 72 of valve element 52. Springs 79 and 81 resist movement of valve element 52 from the illustrated neutral position.

Solenoid valves 36 and 38 receive electrical signals from controller 30 via lines 40 and 42 to direct pressurized fluid to end faces 70 and 72 to thus displace spool valve element 52 longitudinally. Solenoid valves 36 and 38 can be anyone of a number of valves useful in the present combination. They are illustrated as proportional solenoid valves so that the pressure in passages 78 and 80, and thus in bores 74 and 76, can be varied.

In circuits like those illustrated in FIG. 1, the passages are susceptible to increases in viscosity. The size of passages within the solenoid valves 36 and 38 and associated passages 78 and 80 are such that high viscosity causes a great increase in the time to apply pressure to the end faces 70 and 72 and thus the response of the spool valve element 52 to control inputs. In accordance with the invention, a leak path is provided to the sump area 66 so that the temperature increase of pressurizing and discharging fluid is employed to increase the temperature of the control fluid and the motive fluid directed to the actuator 20. The pressure applied to end faces 70 and 72 is contained by lands 82 and 84 which cooperate with the bore 50 to seal the pressure on the end faces. In order to provide the temperature increase, a leakage path is provided between the bores 74 and 76 and the sump 66. While many different arrangements may be used to achieve the leakage path, it is herein illustrated as providing the lands 82 and 84 with an undercut so that there is a clearance between their outer diameter and the inner diameter of bore 50. This is selected so as to provide a relatively low flow rate This is proven to be effective to provide an appropriate increase in temperature of the hydraulic fluid. Because the chambers are at opposite ends of the valve element 52, the pressure in these chambers counteracts one another. However, the pressure within the control chambers is selected to be at a level below the pressure overcoming the spring force of springs 79 and 81 to displace the spool valve 52 from its illustrated central neutral position. This permits a flow to be generated through the system prior to operation controlling the actuator 20 so that temperatures reach levels providing appropriate responses. The system controller 30 provides the signals to the solenoids 36 and 38 to generate pressure levels sufficient to achieve the leakage flow rate and with the intention of reducing the viscosity to acceptable level. In the absence of a need for increasing the temperature of the fluid, the controller 30 may direct signals to solenoids 36 and 38 to have zero pressure within the control chamber and thus minimize the leakage of flow to the sump 66. The system may be automated to the extent that a temperature input from line 34 causes the controller 30 to command appropriate flow when the temperature is below an acceptable level.

Thus it is seen that with minimal alterations to the valve assembly, appropriate temperature increases are provided to the hydraulic fluid thus improving the response time of the hydraulic system under cold ambient temperatures.

Having described the preferred embodiment, it will become apparent that various modifications can be made without departing from the scope of the invention as defined in the accompanying claims.

The invention claimed is:

1. An electro-hydraulic valve comprising:
   a housing having an inlet for pressurized fluid;
   a chamber connected to said inlet and a pair of outlets to direct said fluid to a load;
   a valve element displaceable in said chamber to selectively direct fluid to said outlets, said valve element having at least one surface responsive to fluid pressure to displace said valve for selectively directing pressurized fluid to one or both of said outlets; and
   a device for selectively establishing a continuous leakage flow path from said chamber adjacent said at least one surface, thereby increasing the temperature of said fluid during cold weather conditions.

2. The electro-hydraulic valve as claimed in claim 1, wherein said valve element is linearly displaceable in said chamber.

3. The electro-hydraulic valve as claimed in claim 2, wherein said surface is established at both ends of said valve element.

4. The electro-hydraulic valve as claimed in claim 1, wherein said surface on said valve element defines at least one wall of a chamber receiving pressurized fluid to displace said valve element.

5. The electro-hydraulic valve element as claimed in claim 4, wherein a leakage path is provided adjacent said surface on said valve element.

6. The electro-hydraulic valve element as claimed in claim 4, wherein said valve element is a spool valve and said chamber is a bore adjacent the end of said spool valve element, said leakage path being provided by an undercut on the valve element adjacent said surface.

7. The electro-hydraulic valve element as claimed in claim 1, wherein the valve element is yieldably maintained in a neutral position and pressure provided adjacent said valve element surface is lower than the pressure required to displace said valve element.

8. The electro-hydraulic valve element as claimed in claim 1, wherein the pressure on said surface is controlled by a proportional solenoid valve.

9. The electro-hydraulic control system as claimed in claim 1, wherein said leakage path is provided as needed to maintain fluid temperatures.

10. The electro-hydraulic valve element as claimed in claim 9, wherein the pressure in said chamber is provided by an electric solenoid valve responsive to signals to provide a leakage flow path.

11. A hydraulic actuation system comprising:
    a pump producing pressurized hydraulic fluid;
    a load actuatable by pressurized hydraulic fluid;
    an electro-hydraulic valve comprising a housing having an inlet for pressurized fluid from said pump, a chamber connected to said inlet and a pair of outlets to direct said pressurized hydraulic fluid to said load;
    a valve element displaceable in said chamber to selectively direct said pressurized hydraulic fluid to said outlets, said valve element having at least one surface responsive to fluid pressure to displace said valve for selectively directing fluid to said load;
    a controller for at least controlling fluid pressure to said surface to displace said valve element; and a device for selectively establishing a continuous leakage flow path from said valve element surface to increase the temperature of hydraulic fluid in said system.

12. The hydraulic system as claimed in claim 11, wherein said valve is displaceable linearly within said chamber.

13. The hydraulic system as claimed in claim 12, wherein said valve element has said surface at both ends thereof.

14. The hydraulic system as claimed in claim 11, wherein said surface on said valve element forms at least a part of a chamber within said housing for pressurized fluid displacing said valve element.

15. The hydraulic system as claimed in claim 14, wherein said leakage flow path is established by a clearance adjacent said surface of said valve element.

16. The hydraulic system as claimed in claim 14, wherein said valve element is reciprocable within a bore and said leakage path is established by an undercut adjacent said end surface.

17. The hydraulic system as claimed in claim 11, wherein the pressure on said end face to produce said leakage path is established to be less than the pressure required to displace said valve element.

18. The hydraulic system as claimed in claim 11, wherein the pressure on said end surface is controlled by an electrically actuated proportional control valve.

19. The hydraulic system as claimed in claim 11, wherein pressure is applied to said surface on said end face as needed to increase hydraulic fluid temperature.

20. The control system as claimed in claim 19, wherein said solenoid is electrically controlled and said controller emits electrical signals to control said solenoid.

21. The hydraulic system as claimed in claim 20, further comprising a temperature sensor for sensing a temperature below which said leakage path is established to increase the hydraulic fluid temperature.

* * * * *